H. ROGERS, Sr.
CAR RECORD SHEET,
APPLICATION FILED SEPT. 12, 1919.
Reissued Dec. 23, 1919.
14,778.
2 SHEETS—SHEET 1.
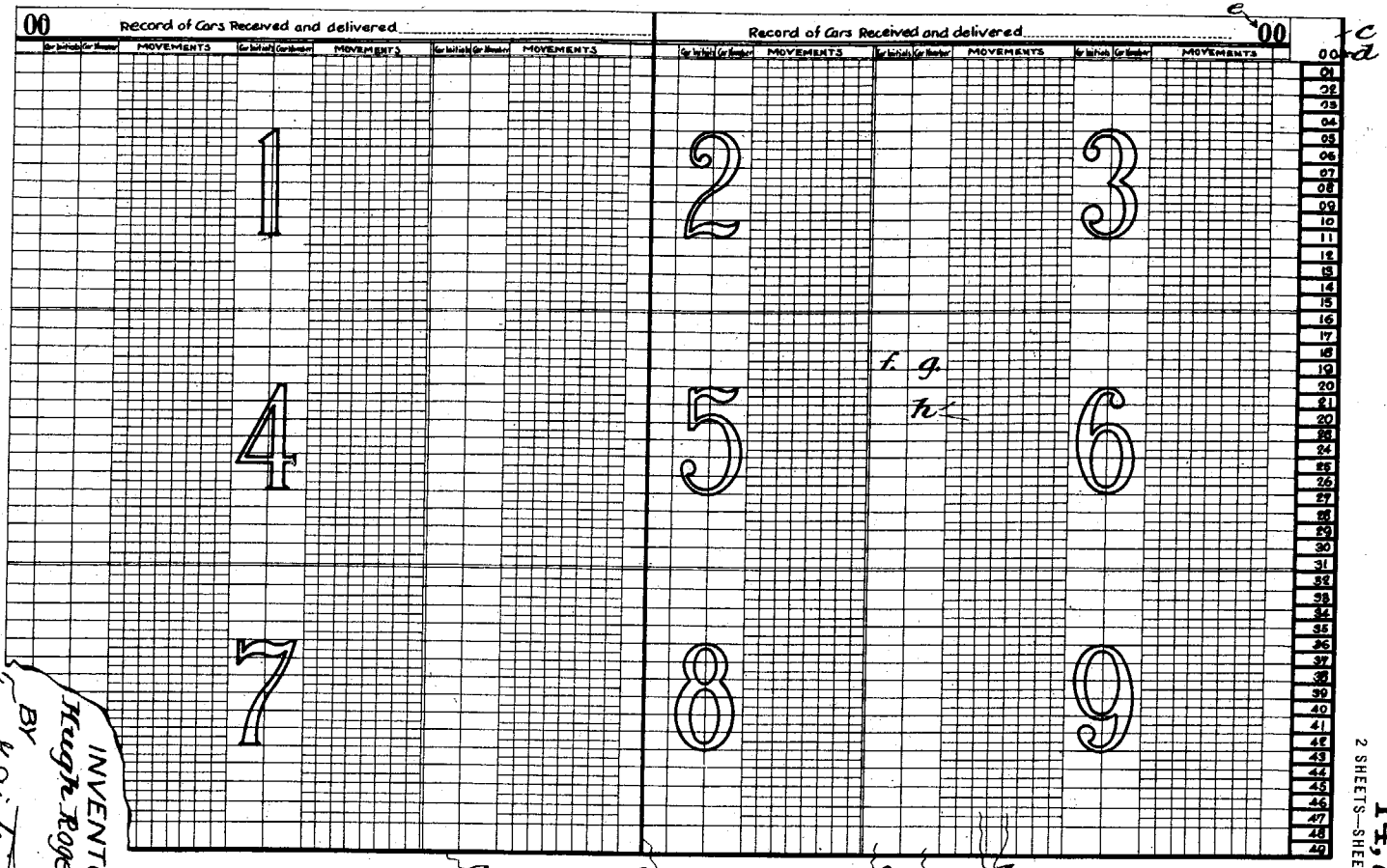

H. ROGERS, Sr.

CAR RECORD SHEET.

APPLICATION FILED SEPT. 12, 1919.

Reissued Dec. 23, 1919.

14,778.

2 SHEETS—SHEET 2.

Fig. 2.

EXAMPLE OF TRAIN SHEET, SHOWING CAR AND NUMBER

| INITIALS | CAR NO. |
|---|---|
| I.M.&.S. | 10001 |
| Mo.P. | 10101 |
| A.R.L. | 1201 |
| F.M.T.X. | 1 |
| C.B.&.Q. | 3301 |
| P.&L.E. | 44401 |
| C.R.I.&.P. | 6501 |
| D.L.&.W. | 16001 |
| T.&.P. | 7001 |
| S.R.L. | 12001 |
| P.&L.E. | 13001 |
| I.C. | 54401 |
| I.C. | 54501 |
| U.R.T. | 6001 |
| C.F.D.X. | 52001 |
| C.F.D.X. | 53001 |
| C.F.D.X. | 54001 |
| C.F.D.X. | 55001 |
| C.F.D.X. | 56001 |
| T.&.P. | 8001 |
| T.&.P. | 9001 |
| W. of A. | 901 |
| C.&.N.W. | 801 |
| M.K.&.T. | 700001 |
| S.Co. | 3701 |
| M.K.&.T. | 100001 |
| A.C.L. | 18701 |
| B.&.O. | 800001 |
| B.&.A. | 900001 |
| Pa. | 500001 |
| Pa. | 520001 |

HOW CAR NUMBERS ARE ENTERED IN CAR RECORD BOOK FROM TRAIN SHEET.

Cars Received and Forwarded ..... 01

| INITIALS | CAR No. | MOVEMENTS | INITIALS | CAR No. | MOVEMENTS | INITIALS | CAR No. | MOVEMENTS |
|---|---|---|---|---|---|---|---|---|
| I.M.&.S. | 100 | 1 | A.R.L. | 12 | 2 | C.B.&.Q. | 33 | 3 |
| Mo.P. | 101 | | S.R.L. | 120 | | P.&L.E. | 130 | |
| F.M.T.X. | #1 | | C.F.D.X. | 320 | | C.F.D.X. | 530 | |
| M.K.&.T. | 1000 | | Pa. | 5200 | | | | |
| P.&L.E. | 444 | 4 | C.R.I.&.P. | 65 | 5 | D.L.&.W. | 160 | 6 |
| C.F.D.X. | 540 | | I.C. | 545 | | U.R.T. | 60 | |
| I.C. | 544 | | Pa. | 5000 | | C.F.D.X. | 560 | |
| | | | C.F.D.X. | 550 | | | | |
| T.&.P. | 70 | 7 | T.&.P. | 80 | 8 | T.&.P. | 90 | 9 |
| A.C.L. | 187 | | B.&.O. | 8000 | | B.&.A. | 9000 | |
| M.K.&.T. | 7000 | | C.&.N.W. | 8 | | W. of M. | 9 | |
| S.Co. | 37 | | | | | | | |

Fig. 3.

| INITIALS | CAR No. | MOVEMENTS | | | | | | | |
|---|---|---|---|---|---|---|---|---|---|
| I.M.&.S. | 100 | I.M.&S. May 1. | I.C. May 6 | I.&.N May 12 | I.M.&S. May 29 | | | | |

INVENTOR

Hugh Rogers, Sr.

BY

Fred G. Dieterich Co.

ATTORNEYS

UNITED STATES PATENT OFFICE.

HUGH ROGERS, SR., OF NEW ORLEANS, LOUISIANA, ASSIGNOR TO HAUSER PRINTING COMPANY, INCORPORATED, OF NEW ORLEANS, LOUISIANA.

CAR-RECORD SHEET.

14,778. Specification of Reissued Letters Patent. Reissued Dec. 23, 1919.

Original No. 1,247,881, dated November 27, 1917, Serial No. 168,464, filed May 14, 1917. Application for reissue filed September 12, 1919. Serial No. 323,419.

*To all whom it may concern:*

Be it known that I, HUGH ROGERS, Sr., residing at New Orleans, in the parish of Orleans and State of Louisiana, have invented certain new and useful Improvements in Car-Record Sheets, of which the following is a specification.

The invention relates to certain improvements in record book sheets for keeping track of cars of railroad systems and it has for its object to facilitate the location of the cars and to provide a record book, the use of which will be more convenient, exact, precise and economical than is the case with record books now employed.

The invention, in its preferred embodiment, also includes a system of car indexing whereby the page location of the car entry bears a definite relation to the car number, the page or page group, (*i. e.*, single page or double page, etc.,) being divided into sections corresponding to the nine digits 1 to 9, inclusive, each section having definite relation to the car number, whereby car entries may be distributed over the page in well defined groups so that location of any particular car or cars may be readily determined.

In carrying out the invention a book is provided having its pages (either single or double) indexed from 0 to 100 and arranged in one or more volumes, as may be found convenient, each page having an index tab giving its number and each page or page group, (*i. e.*, single page or double page, etc.,) being divided into sections numbered from 1 to 9, inclusive, and suitably ruled to show the identification initials of the cars, their numbers and the movements of the cars.

In the drawings:

Figure 1 is a plan view of one volume of a two-volume book open at the first page "00" and ruled as a double page, the binding being done along the central line.

Fig. 2 is a similar view of a single-page-ruled sheet arranged as an illustration or specimen page to show the use of the invention.

Fig. 3 is a detail view on an enlarged scale of a portion of a sheet, showing the manner of making entries.

In the drawings, which illustrate preferred embodiments of the invention, *a* represents the sheet, which may be either a single sheet, as shown in Fig. 2, or a double sheet, as shown in Fig. 1. When the sheets are double ones they are bound along the midline *b* in book form, and each sheet has an index tab *c* numbered as at *d* to correspond with the page number *e*.

Each page or sheet *a* is divided into sections or compartments, numbered 1 to 9, respectively, and each section or compartment is suitably ruled to provide lines and spaces forming columns *f* for the reception of the initials of the car, columns *g* for the reception of the number of the car, and a plurality of columns *h* for the reception of the necessary data giving the car movements.

The various sheets are bound together and are preferably preceded by an instruction sheet, such as shown in Fig. 2, for instance.

In using the invention, it will be assumed that the book be the record kept for any given railroad company. A car is received from another road, say the I. M. & S., car #10001. The record keeper looks at the last two figures of the car number. This determines the book page on which the entry is to be made. In the example given, the last two figures are "01", so he turns to page #01 of the book. He then takes the next figure to the left of page 2, which gives him the page section in which the entry is to be made. The next figure is "1" (passing over the ciphers) so the entry is made in page "01" section #1. Having thus determined the page and page section in which the entry is to be made, the record keeper puts down the car initials in column *f*, viz., "I. M. & S." and in column *g* he puts the car number, either in full or with the omission of the last two figures, because the page number will always be the same as the last two figures of the car number and thus the work of putting down these last two figures may be saved, since only the remaining figures of the car number need be entered, viz., #100.

In the first or upper space *k* to the right in the first column *h* he puts the initials of the road from which the car was received and beneath that in the space *l* he puts the date of the receipt of the car (see Fig. 3). When the car goes out he enters the initials of the company to which the car goes in the space K′ in the next space of the column *h* and the date in the space L′ beneath.

When the car returns, he enters the initials of the company from which it was received in the adjoining space $K^2$ and the date in the space $L^2$ below and this continues until the car is returned to its owner.

If it is desired to find out the whereabouts of any car that has passed over the road whose record is being kept, the car initials and numbers being known, (say M. K. & T. #700009) the operator turns to page #09, #09 being the last two figures of the car number. He then looks in sheet section #7, the next figure to the right being #7, (ciphers being ignored) and there in section #7 of page 9 he will find the record of the car he is looking for.

If the car is numbered 700001, it will be found on page #01 in section #7. If it be a car having the number 57689, it will be found on page #89, in section 6, etc.

Thus, it will be seen a simple and effective means is provided for recording cars and determining at a glance when they were received and whether or not they have been passed onto another line and if so, the line to which they have been passed on and the date of transfer is readily determined.

While I have illustrated and described the preferred embodiments of my invention, it will be understood that slight alterations in the arrangement of sheets, spaces on the sheets, the design of ruling employed, the arrangement or division of sheets into volumes or the number of volumes per book, etc., may be made to suit the requirements of particular users, all without departing from the spirit of the invention.

From the foregoing description, it is thought the complete operation and advantages of the invention will be readily understood by those skilled in the art.

What I claim is:

1. A car record book comprising sheets numbered from 0 to 99 inclusive, each sheet being divided into nine sections only which are respectively numbered 1 to 9, each section having suitably ruled lines and spaces to provide a column for receiving the car initials, a column for receiving the car numbers and a series of columns for entering the car movements, the page numbering having reference to the last two figures of the car number and the section numbering having reference to the next figure of value to the left of the second from the last figure of the car number.

2. A car record book comprising sheets numbered from 0 to 99 inclusive, the sheets being divided into nine sections which are respectively numbered 1 to 9, each section having suitably ruled lines and spaces to receive the data identifying the car and the movements thereof, all cars having the last two figures of their number the same being entered on the same page, and all cars having the figures preceding the last two the same being entered in the same page-section.

3. A car record book comprising sheets numbered consecutively each sheet being divided into nine compartments or sections, each section being ruled to provide three sets of columns, one set for the initials of the car, one set for the car number and one set for the movements of the car, the page numbering of the sheets corresponding to the last two figures of the car number and the page sections being numbered from 1 to 9 respectively have relation to the next figure of value to the left of the second from the last figure of the car number.

4. A car record comprising sheets numbered consecutively, the sheets being divided into compartments or sections, said sections being arranged in groups numbered respectively upward *seriatim* to 9, each section being ruled to provide three sets of columns, one set for the initials of the car, one set for the car number and one set for the movements of the car, the page numbering of the sheets corresponding to the last two figures of the car number and the numbering of the page sections having relation to the next figure of value to the left of the second from the last figure of the car number, substantially as shown and described.

HUGH ROGERS, Sr.